US012754060B2

(12) United States Patent
Gomaa et al.

(10) Patent No.: US 12,754,060 B2
(45) Date of Patent: Oct. 6, 2026

(54) TESTING AUGMENATION SCHEME BY STIPULATING MULTI-PHASE FLOW METER (MFPM) ENGINEERING ENHANCEMENT METHODOLOGY "TASSMEEM"

(71) Applicant: SAUDI ARABIAN OIL COMPANY, Dhahran (SA)

(72) Inventors: Mohammed Elmetwally Gomaa, Ras Tanura (SA); Karam Sami Yateem, Ras Tanura (SA); Mohammed T. Khanferi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 447 days.

(21) Appl. No.: 18/457,896

(22) Filed: Aug. 29, 2023

(65) Prior Publication Data

US 2025/0076098 A1 Mar. 6, 2025

(51) Int. Cl.
*G01F 25/10* (2022.01)
*E21B 47/10* (2012.01)
*G01F 1/74* (2006.01)

(52) U.S. Cl.
CPC .............. *G01F 25/10* (2022.01); *E21B 47/10* (2013.01); *G01F 1/74* (2013.01); *E21B 2200/22* (2020.05)

(58) Field of Classification Search
None
See application file for complete search history.

(56) References Cited

U.S. PATENT DOCUMENTS 10,983,513 B1 4/2021 Al Kadem et al.
11,118,452 B1 9/2021 Yateem et al.
(Continued)

OTHER PUBLICATIONS

Al-Khamis, Mohammed N. et al., "Evaluation of PhaseWatcher Multiphase Flow Meter (MPFM) Performance in Sour Environments"; Proceedings of the Offshore Technology Conference; Paper No. OTC-19152-MS; pp. 1-6; May 5, 2008 (6 pages).
(Continued)

*Primary Examiner* — Matthew G Marini
(74) *Attorney, Agent, or Firm* — Osha Bergman Watanabe & Burton LLP

(57) ABSTRACT

Methods and systems for a testing augmentation and engineering enhancement manager include: obtaining operating data, input diagnostic parameter data, and calibration data regarding a multi-phase flow meter (MPFM) in a production system, determining a verification assessment using a first machine-learning model comprising a functional status for the MPFM, and determining a validation assessment by comparing the current the historical flowrate measurement data. The methods and systems further include determining a virtual flow meter (VFM) measurement using a second machine-learning model based on a plurality of VFM inputs in the operating data, determining a calibration assessment comprising a health report identifying whether the MPFM requires a second recommended action, and transmitting, in response to the validation assessment, the VFM measurement, the verification assessment, and the calibration assessment, an action point for the MPFM. The action point includes an alarm for a procedure that adjusts or replaces the MPFM.

20 Claims, 10 Drawing Sheets

(56) References Cited

U.S. PATENT DOCUMENTS

| | | | | |
|---|---|---|---|---|
| 2015/0135797 | A1 | 5/2015 | Romero et al. | |
| 2018/0274961 | A1* | 9/2018 | Miller .................. | G08B 21/187 |
| 2021/0042634 | A1 | 2/2021 | Maucec | |

OTHER PUBLICATIONS

Kettle, R.J. et al., "The Multiphase Flowmeter, A Tool for Well Performance Diagnostics and Production Optimization"; Proceedings of the SPE Asia Pacific Oil and Gas Conference and Exhibition; Paper No. SPE-77893-MS; pp. 1-8; Oct. 8, 2022 (8 pages).

Fetoui, Islam, "Multiphase flow correlations"; Production Techonology; <https://production-technology.org/multiphase-flow-correlations/>; Accessed Aug. 28, 2023 (9 pages).

Bikmukhametov, Timur, "Machine Learning and First Principles Modeling Applied to Multiphase Flow Estimation"; Thesis for the Degree of Philosophiae Doctor; Norwegian University of Science and Technology, Faculty of Natural Sciences, Department of Chemical Engineering; pp. iii-159; Dec. 2020 (125 pages).

Aly, Mohamed Aly Abd El-Moniem, "Evaluation and Proper Selection of Multiphase Flow Correlations"; A Thesis Submitted to the Faculty of Engineering at Cairo University in Partial Fulfillment of the Requirements for the Degree of Master of Science in Petroleum Engineering; pp. i-255; 2016 (304 pages).

Barbariol, Tommaso et al., "Self-Diagnosis of Multiphase Flow Meters through Machine Learning-Based Anomaly Detection"; Energies; vol. 13, Issue 12, Article 3136; pp. 1-24; Jun. 2020 (24 pages).

Barbariol, Tommaso et al., "A Machine Learning-Based System for Self-Diagnosis Multiphase Flow Meters"; Proceedings of the International Petroleum Technology Conference; Paper No. IPTC-19865-MS; pp. 1-14; Jan. 13, 2020 (14 pages).

Barbariol, T. et al., "Validity and consistency of MPFM data through a Machine Learning based system"; Proceedings of 37th North Sea Flow Measurement Workshop; 2019 (12 pages).

* cited by examiner

TESTING AUGMENATION SCHEME BY STIPULATING MULTI-PHASE FLOW METER (MFPM) ENGINEERING ENHANCEMENT METHODOLOGY "TASSMEEM"

BACKGROUND

As oil, gas, and water are produced from a well, they typically flow as a non-homogeneous mixture of phases through a pipeline from the wellhead to a separator. A multiphase flow meter (MPFM) is a device that may be installed on a pipeline to measure the rate at which each phase (oil, gas, water) is flowing. MPFM data are essential for reservoir monitoring and production optimization. Often, MPFM data is processed using vendor-provided software and MPFMs are calibrated on a timely schedule. When MPFMs malfunction, multiphase flowrate measurements are inaccurate or are unavailable to an operator or well and field analysis system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for a testing augmentation and engineering enhancement manager, comprising: obtaining, by a computer processor, operating data, input diagnostic parameter data, and calibration data regarding a multi-phase flow meter (MPFM) in a production system, wherein operating data comprises current flowrate measurement data and historical flowrate measurement data of a multiphase fluid flowing in a pipeline in the production system; determining, by the computer processor and based on the input diagnostic parameter data, a verification assessment using a first machine-learning model comprising a functional status for the MPFM, wherein the verification assessment comprises a status report identifying whether the MPFM requires a first recommended action; determining, by the computer processor and based on the operating data, a validation assessment by comparing the current flowrate measurement data and the historical flowrate measurement data, wherein the validation assessment identifies whether the current flowrate measurement data satisfies a validity criterion for the MPFM; determining, by the computer processor in response to the current flowrate measurement data failing to satisfy the validity criterion, a virtual flow meter (VFM) measurement using a second machine-learning model based on a plurality of VFM inputs in the operating data; determining, by the computer processor and based on the calibration data, a calibration assessment comprising a health report identifying whether the MPFM requires a second recommended action; and transmitting, by the computer processor in response to the validation assessment, the VFM measurement, the verification assessment, and the calibration assessment, an action point for the MPFM, wherein the action point comprises an alarm for a procedure that adjusts or replaces the MPFM.

In one aspect, embodiments disclosed herein relate to a system comprising a well in a production system comprising a multi-phase flow meter (MPFM) configured to measure operating data of the well; a testing augmentation and engineering enhancement manager comprising a computer processor and coupled to the well, wherein the testing augmentation and engineering enhancement manager is configured to perform a method comprising: obtaining, by a computer processor, the operating data, input diagnostic parameter data, and calibration data regarding the production system, wherein operating data comprises current flowrate measurement data and historical flowrate measurement data of a multiphase fluid in a pipeline in the production system; determining, by the computer processor and based on the input diagnostic parameter data, a verification assessment using a first machine-learning model comprising a functional status for the MPFM, wherein the verification assessment comprises a status report identifying whether the MPFM requires a first recommended action; determining, by the computer processor and based on the operating data, a validation assessment by comparing the current flowrate measurement data and the historical flowrate measurement data, wherein the validation assessment identifies whether the current flowrate measurement data satisfies a validity criterion for the MPFM; determining, by the computer processor in response to the current flowrate measurement data failing to satisfy the validity criterion, a virtual flow meter (VFM) measurement using a second machine-learning model based on the operating data; determining, by the computer processor and based on the calibration data, a calibration assessment comprising a health report identifying whether the MPFM requires a second recommended action; transmitting, by the computer processor in response to the validation assessment, the VFM measurement, the verification assessment, and the calibration assessment, an alarm that displays an action point for the MPFM, wherein the action point comprises a procedure that adjusts or replaces the MPFM.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
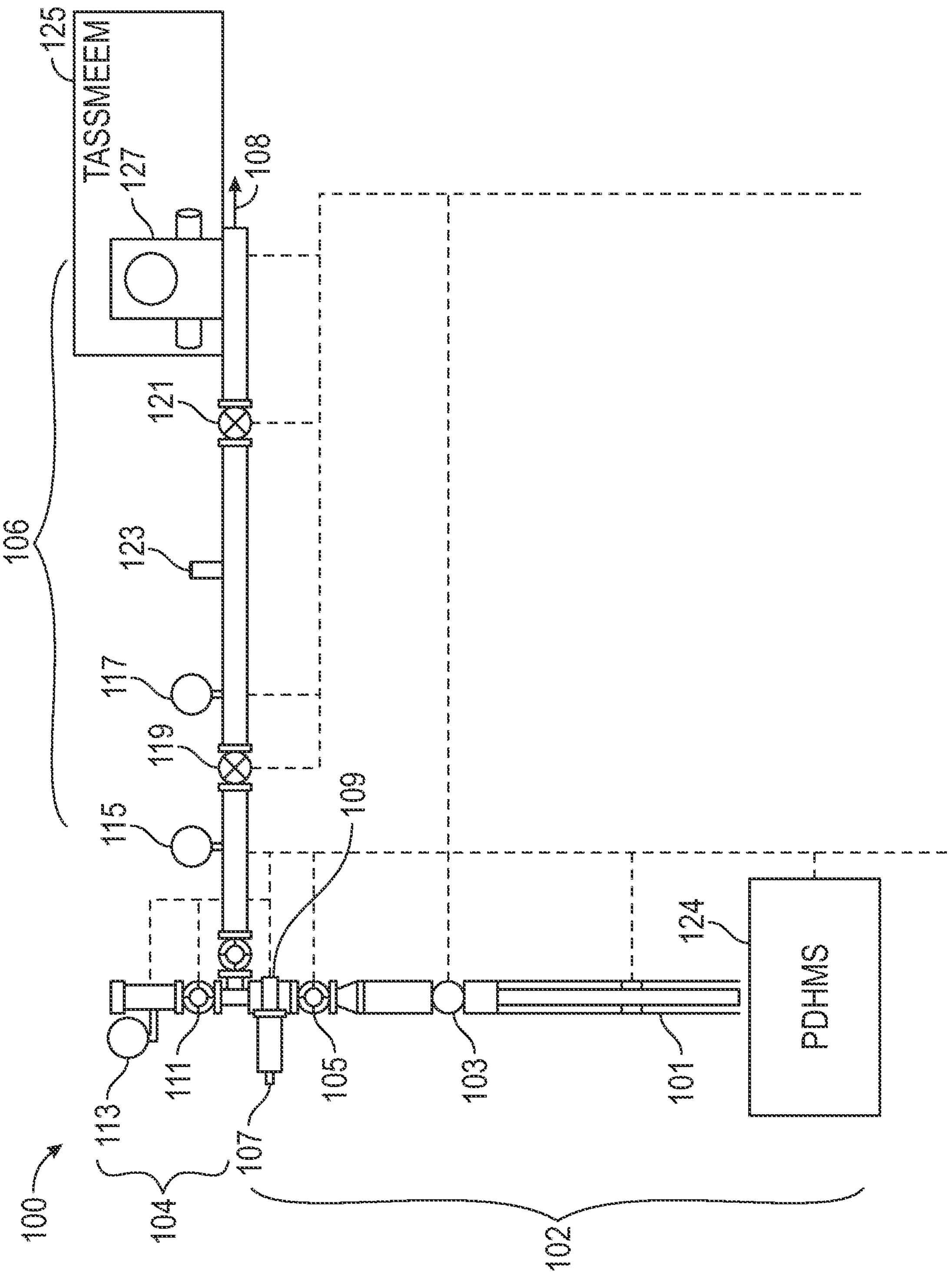
FIG. 1 depicts a pipeline in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In one aspect, embodiments of the disclosure include systems and methods for a testing augmentation scheme by stipulating multi-phase flow meter (MPFM) engineering enhancement methodology (TASSMEEM) using artificial intelligence. TASSMEEM is an integrated automated system that verifies MPFM performance in real time and checks MPFM calibration validity. TASSMEEM may be referred to in the disclosure as "testing augmentation and engineering enhancement manager). The MPFMs may come from different vendors, each with an associated software to, at the very least, receive flowrate measurements from the MPFM. When an MPFM malfunctions, flowrate measurements at the location of the MPFM are either inaccurate or nonexistent. The TASSMEEM provides a unified platform for verifying MPFM measurements, validating MPFM calibration, and providing recommended actions.

In accordance with one or more embodiments, the TASSMEEM disclosed herein is configured to receive operating data, such as sensor values and flowrate measurements, from one or more MPFMs, regardless of the vendor of the MPFM. Further, the TASSMEEM is configured to detect MPFM malfunctions, identify MPFM issues, validate MPFM calibration, and proactively prescribe MPFM preventative maintenance actions. Additionally, the TASSMEEM is configured to receive measurements from field devices of the well and/or oil and gas field. Some embodiments determine a validation assessment of the MPFM based on current and historical flowrate data.

In some embodiments, the TASSMEEM is configured to estimate the flowrates of a multiphase fluid using artificial intelligence including a machine-learning model based on the received field device measurements and validation assessment. Estimating flowrates using field device measurements instead of a MPFM is a process referred to herein as a virtual flow meter (VFM). In other words, in accordance with one or more embodiments, the TASSMEEM can receive flowrate measurements from MPFMs and estimate flowrates using VFMs. By default, the TASSMEEM outputs flowrate measurements acquired using one or more MPFMs.

The flowrate data determined and output by the TASSMEEM may be received by a system user or other system. For example, the flowrate data may be used by a reservoir simulator or subsurface model to optimize production of hydrocarbons from a well and/or oil and gas field. In the event that the TASSMEEM detects a malfunction in an MPFM, the flowrate provided to a system user, or other system that makes use of flowrate data, is replaced by a VFM estimate determined by the TASSMEEM. As such, accurate multiphase flowrate measurements from a well, or oil and gas field, are provided by the TASSMEEM without interruption. In some embodiments, the TASSMEEM determines a verification assessment using artificial intelligence including a machine-learning model to identify potential failures or errors of the MPFM. The TASSMEEM validates a current calibration status in advance without any human intervention based on an analysis of MPFM main calibration parameter data. Further, the TASSMEEM allows for proactive and intelligent scheduling of MPFM maintenance activities based on the validation assessment, the VFM estimate, the verification statement, and the calibration assessment.

In accordance with one or more embodiments, FIG. 1 depicts a simplified portion of a pipeline (100) of a multilateral well in an oil and gas field. Herein, an oil and gas field is broadly defined to consist of wells which produce at least some oil and/or gas. Hydrocarbon wells typically produce oil, gas, and water in combination. The relative amounts of oil, gas, and water may differ between wells and vary over any one well's lifetime.

For clarity, the pipeline (100) is divided into three sections; namely, a subsurface (102) section, a tree (104) section, and a flowline (106) section. It is emphasized that pipelines (100) and other components of wells and, more generally, oil and gas fields may be configured in a variety of ways. As such, one with ordinary skill in the art will appreciate that the simplified view of FIG. 1 does not impose a limitation on the scope of the present disclosure. As part of the subsurface (102) section, FIG. 1 shows an inflow control valve (ICV) (101). An ICV (101) is an active component usually installed during well completion. The ICV (101) may partially or completely choke flow into a well. Generally, multiple ICVs (101) are installed along the reservoir section of a wellbore. Each ICV (101) is separated from the next by a packer. Each ICV (101) can be adjusted and controlled to alter flow within the well and, as the reservoir depletes, prevent unwanted fluids from entering the wellbore.

The subsurface (102) section of the pipeline (100) has a subsurface safety valve (SSSV) (103). The SSSV (103) is designed to close and completely stop flow in the event of an emergency. Generally, an SSSV (103) is designed to close on failure. That is, the SSSV (103) requires a signal to stay open and loss of the signal results in the closing of the valve. Also shown as part of the subsurface (102) section is a permanent downhole monitoring system (PDHMS) (124). The PDHMS (124) consists of a plurality of sensors, gauges, and controllers to monitor subsurface flowing and shut-in pressures and temperatures. As such, a PDHMS (124) may indicate, in real-time, the state or operating condition of subsurface equipment and the fluid flow.

Turning to the tree (104) section of FIG. 1 is a master valve (MV) (105), a surface safety valve (SSV) (107), and a wing valve (WV) (109). The MV (105) controls all flow from the wellbore. For safety considerations, an MV (105) is usually considered so important that two master valves (MVs) (second not shown) are used wherein one acts as a backup. Like unto the SSSV (103), the SSV (107) is a valve installed on the upper portions of the wellbore to provide emergency closure and stoppage of flow. Again, SSVs (107) are designed to close on failure. One or more WVs (109) may be located on the side of the tree (104) section, or on temporary surface flow equipment (not shown). WVs (109) may be used to control and isolate production fluids and/or be used for treatment or well-control purposes.

Also shown in FIG. 1 is a control valve (CV) (111) and a pressure gauge (PG) (113). The CV (111) is a valve that controls a process variable, such as pressure, flow, or temperature, by modulating its opening. The PG (113) monitors the fluid pressure at the tree (104) section.

Turning to the flowline (106) section, the flowline (106) transports (108) the fluid from the well to a storage or processing facility (not shown). A choke valve (119) is disposed along the flowline (106). The choke valve (119) is used to control flowrate and reduce pressure for processing the extracted fluid at a downstream processing facility. In particular, effective use of the choke valve (119) prevents damage to downstream equipment and promotes longer periods of production without shut-down or interruptions. The choke valve (119) is bordered by an upstream pressure transducer (115) and a downstream pressure transducer (117) which monitor the pressure of the fluid entering and exiting the choke valve (119), respectively. The flowline (106) shown in FIG. 1 has a block and bleed valve system (121) which acts to isolate or block the flow of fluid such that it does not reach other downstream components. The flowline (106) may also be outfitted with one or more temperature sensors (123).

The various valves, pressure gauges and transducers, and sensors depicted in FIG. 1 may be considered field devices of an oil and gas field. As shown, these field devices may be disposed both above and below the surface of the Earth. These field devices are used to monitor and control components and sub-processes of an oil and gas field. It is emphasized that the oil and gas field devices depicted in FIG. 1 are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency.

The field devices may be distributed, local to the sub-processes and associated components, global, connected, etc. The field devices may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a pipeline (100). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In accordance with one or more embodiments, FIG. 1 depicts the TASSMEEM (125). The TASSMEEM includes functionality for field device monitoring and data collection. In one or more embodiments, the TASSMEEM (125) further includes functionality for issuing field device commands. As will be described in greater detail with reference to FIG. 4, the TASSMEEM (125) includes functionality to output and visualize multiphase flowrate measurements to a control room or operations center, analyze MPFMs for malfunctions, automatically validate MPFM calibration, intelligently recommend preventative maintenance activities, provide alerts and/or alarms, estimate multiphase flowrates from field device data (i.e., a VFM estimate), and continuously provide accurate multiphase flowrate measurements regardless of the state of any MPFM. To emphasize that the TASSMEEM (125) can monitor and, in some embodiments, control the various field devices of a well and/or an oil and gas field, dashed lines connecting various field devices to the TASSMEEM (125) are shown in FIG. 1.

Figure 2:
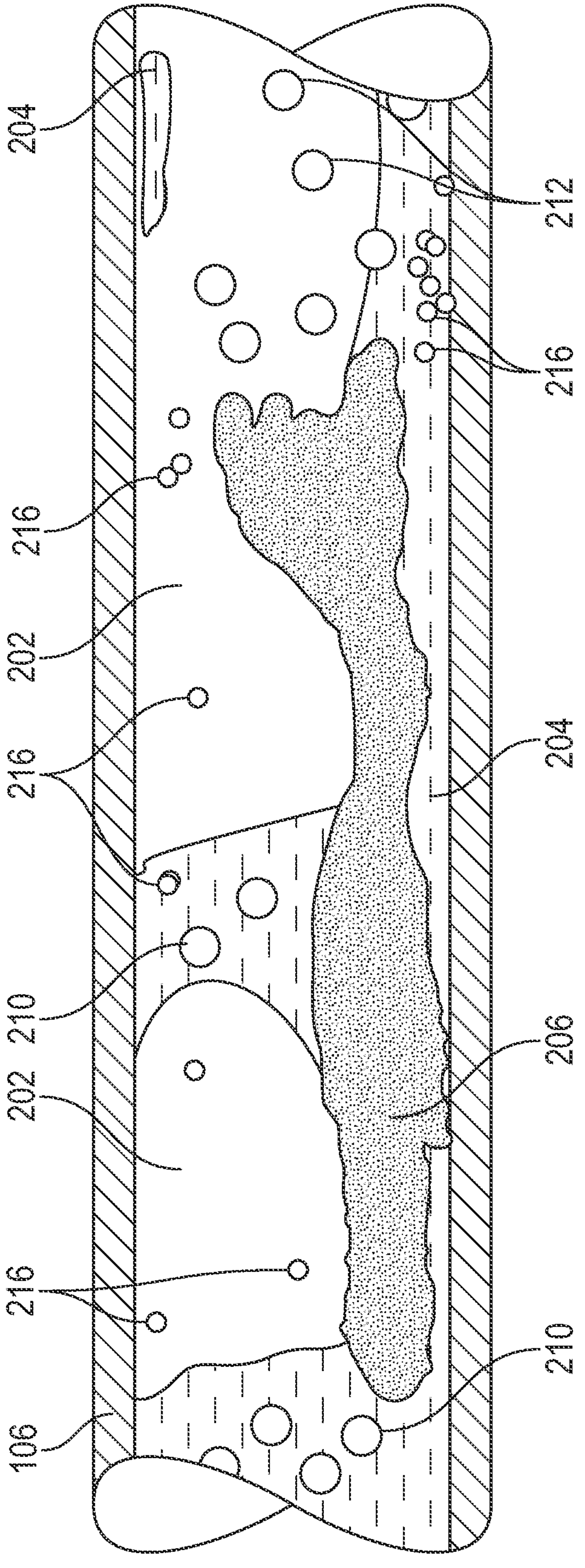
FIG. 2 depicts a multiphase fluid flowing in a pipe, in accordance with one or more embodiments.

FIG. 2 depicts a simplified view of a cross-section of a flowline (106) carrying a multiphase fluid. As seen, the multiphase fluid may have multiple constituents such as gas (202), water (204), and oil (206). The various constituents of the multi-phase fluid may be distributed within the flowline (106) in a myriad of ways. As a non-limiting example, gas (202) may be enclosed by liquids (water or oil) forming bubbles (210). Or, in contrast, liquid droplets, such as oil droplets (216) and water droplets (212), may be dispersed in the gas (202) to form a mist. In general, the state of the multiphase fluid may be described using broad classifications. That is, the multi-phase fluid may be categorized as "bubbly," "annular," "churn," "mist," "stratified," or other designations (flow classes) based on the distribution of the constituents and their relative quantities. The state of the multiphase fluid may be transient such that any assignment of flow class may change with time.

Oil and gas field devices, like those shown in FIG. 1 (and others not shown), monitor and govern the behavior of the components and sub-processes of the well and/or the oil and gas field. Therefore, the productivity of the well and/or the oil and gas field is directly affected, and may be altered by, at least some, of the field devices. Generally, complex interactions between oil and gas field components and sub-processes exist such that configuring field devices for optimal production is a difficult and laborious task. Further, the state and behavior of oil and gas fields is transient over the lifetime of the constituent wells requiring continual changes to the field devices to enhance production.

To inform and optimize the settings of the field devices of a pipeline (100) to maximize hydrocarbon production, it is beneficial, if not critical, to determine the instantaneous state of the multiphase flow. To this end, the pipeline (100) depicted in FIG. 1 is outfitted with a multiphase flow meter (MPFM) (127). An MPFM (127) is a device installed on the flowline (106) to measure the rate at which each phase—oil, gas, water—is flowing. That is, the MPFM (127) may detect the instantaneous amount of gas, oil, and water flowing in the pipeline (100). As such, the MPFM (127) indicates additional quantities such as percent water cut (% WC) and the gas-to-oil ratio (GOR).

Figure 3:
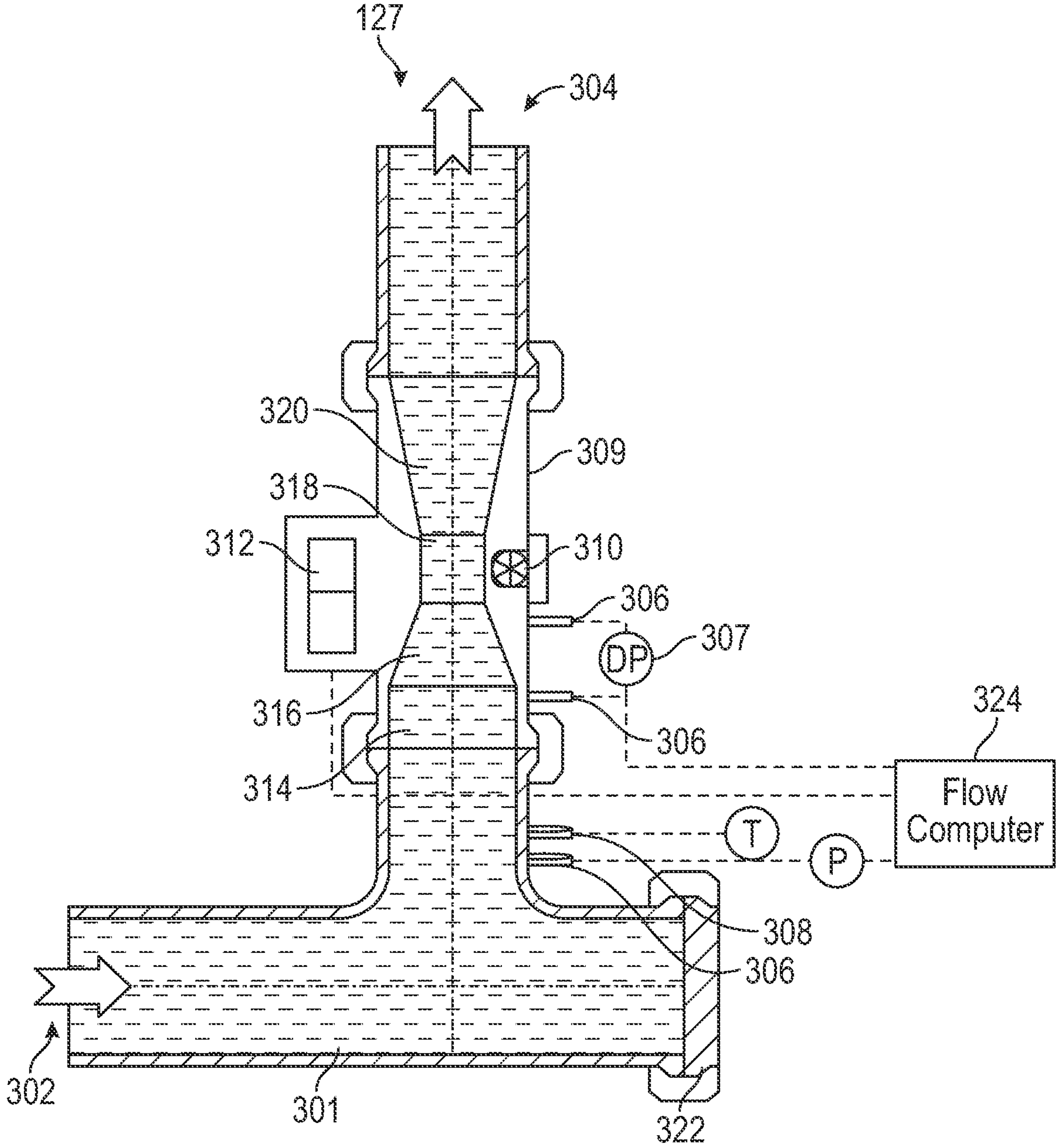
FIG. 3 depicts a multiphase flow meter, in accordance with one or more embodiments.

In general, an MPFM (127) cannot directly measure the flowrate of the individual phases in a fluid. Rather, an MPFM (127) is a collection of sensors, transmitters, mechanical devices, flow conduits, and programmed relationships that are used to determine the individual phase flowrates. FIG. 3 depicts an MPFM (127) in accordance with one or more embodiments. A MPFM (127) may be disposed in line with a flowline (106), or proximate to a flowline (106), such that the MPFM (127) can receive the multiphase fluid (301) through a flow inlet (302) and return the fluid through a flow outlet (304). The MPFM (127) of FIG. 3 includes one or more pressure sensors (306) and temperature sensors (308) to measure the pressure (P) and temperature (T), respectively, at various locations within the MPFM (127). The pressure (P) and temperature (T) measurements are used, in part, to determine the thermophysical state and the thermophysical properties of the multiphase fluid (301). For example, the pressure (P) and temperature (T) values may be used with a functional or tabulated equation of state (EoS) to determine other properties of the multiphase fluid (301).

The MPFM (127) of FIG. 3 may use a gamma densitometer (309) to measure the bulk density of the multiphase fluid (301). The gamma densitometer (309) emits a beam of photons from a nuclear source (310). The emitted photons are attenuated by the multiphase fluid (301) and the amount of attenuation is determined using a nuclear detector (312) that measures the number of received photons. The amount of attenuation is greatly affected by the bulk density of the multiphase fluid (301). Further, because gas has a significantly lower density compared to water and oil, the gamma densitometer (309) can be used to accurately determine the liquid (water and oil) and gas fractions of the multiphase fluid (301).

The MPFM (127) depicted in FIG. 3 may further include a Venturi section. The Venturi section is composed of a Venturi inlet (314), a nozzle (316), a throat section (318), and a diffuser (320). The constriction in flow that occurs in the Venturi section acts to increase the bulk flow velocity of the multiphase fluid (301) and is associated with a decrease in pressure (P). The MPFM (127) is configured with pressure sensors (306) to determine the difference in pressure (DP) (307) of the multiphase fluid (301) between the Venturi inlet (314) and the throat section (318). The Venturi section is used to measure mass flowrates.

The MPFM (127) of FIG. 3 may include a blind tee or static mixer (322). The blind tee (322) serves to condition the flow of the multiphase fluid (301) such that it is homogeneous before entering the main body of the MPFM (127). The blind tee (322) is disposed immediately upstream of the Venturi section and creates a mixing effect that stabilizes intermittent flow regimes commonly encountered in multiphase fluids (301) associated with wells. The blind tee (322) also mitigates any flow interaction with field devices located upstream from the MPFM (127) such as the choke valve (119).

Figure 10:
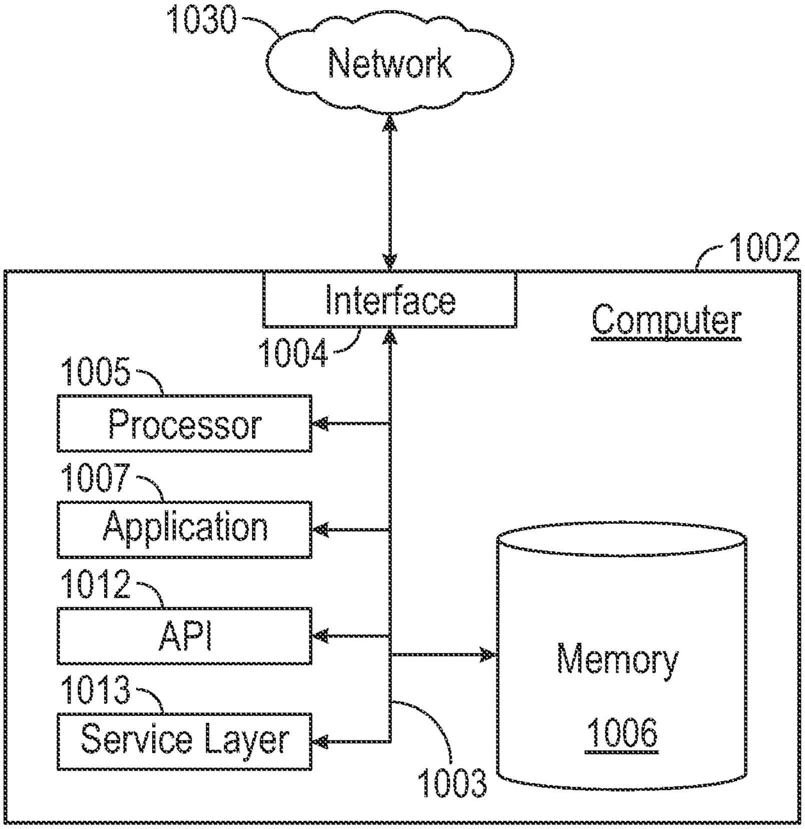
FIG. 10 depicts a computer system, in accordance with one or more embodiments.

The MPFM (127) is outfitted with a flow computer (324). The flow computer (324) receives the readings from the sensors (e.g., temperature sensor (308), pressure sensor (306)) of the MPFM (127). That is, the flow computer (324) acts, in part, as a data acquisition unit. Upon collecting the sensor data, the flow computer (324) calculates the individual flowrates of the oil, gas, and water present in the multiphase fluid (301). The flow computer (324) can transmit the computed flowrates and acquired sensor data to an external system such as the TASSMEEM (125). Alternatively, the flow computer (324) may be part of the TASSMEEM (125). Generally, the flow computer (324) makes use of programmed relationships to determine the phase flowrates from the acquired sensor data. The programmed relationships may include or make use of analytical or tabulated equations of state (EoS) data, phenomenological models, physics-based relationships, bounded correlations, and governing equations (e.g., conservation of mass). In one or more embodiments, the flow computer (324) may be a computer system as depicted in FIG. 10, which will be described in greater detail later in the disclosure.

It is emphasized that the MPFM (127) depicted in FIG. 3 is provided only as an example. In practice, many different types of MPFMs (127) exist. MPFMs (127) may differ in the types of sensors used, the data they collect, and the programmed relationships used to convert the measured flow properties to phase flowrates. For example, in some instances, a MPFM (127) may further be outfitted with a capacitance sensor to determine the fraction of oil, water, and gas in the multiphase fluid (301). In other instances, an MPFM (127) may use any combination of an X-ray source and detector, electrodes, strain gauges, magnetic resonance, and optical sensors and computer vision-based algorithms. One with ordinary skill in the art will recognize that the above description of a MPFM (127) or the components that may make up a MPFM (127) are non-exhaustive and should not be construed to impose a limitation on the instant disclosure. In general, the TASSMEEM (125) disclosed herein can work with any type of MPFM (127).

Figure 4:
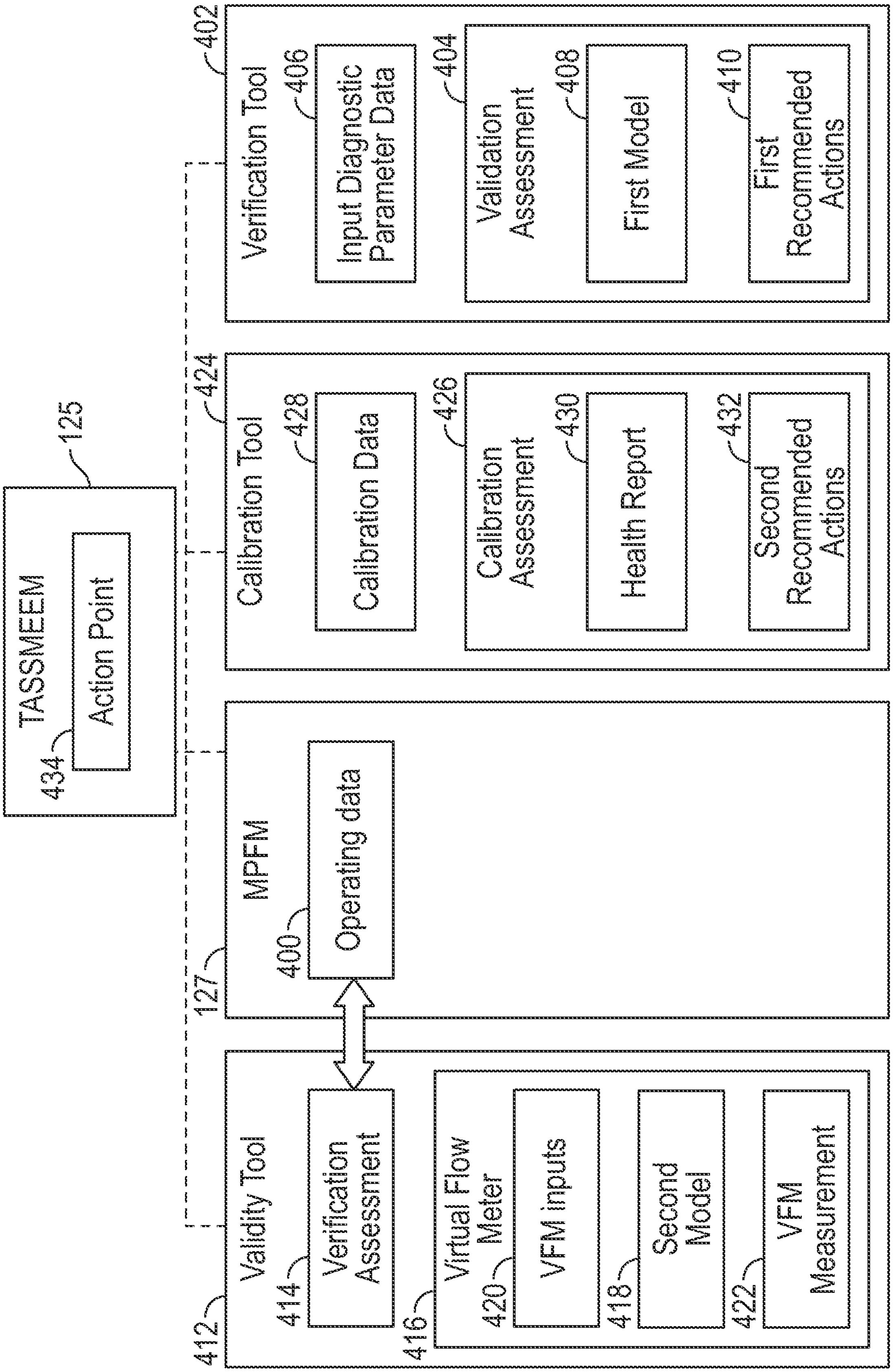
FIG. 4 depicts a testing augmentation scheme by stipulating multi-phase flow meter engineering enhancement methodology, in accordance with one or more embodiments.

The main elements of the TASSMEEM (125) are shown in FIG. 4. It is noted that the elements shown in FIG. 4 are abstractions and that, in practice, an element may not be unique or independent from other elements of the system. Further, the functionality of one or more elements may be shared between any number of elements. As depicted in FIG. 4, the TASSMEEM (125) is connected to at least one MPFM (127). The MPFM (127) provides current and historical operating data (400) such as phase flowrates, or the individual flowrates of oil, water, and gas, flowing through a pipeline (100) at the location of the MPFM (127). The operating data (400) may further include phase fractions, such as water cut (WC) and gas to oil ratio (GOR). For clarity, the TASSMEEM (125) will be discussed as connected to a single MPFM (127), however, one skilled in the art will recognize that the TASSMEEM (125) can be used with any number of MPFMs (127). Further, the TASSMEEM (125) can work with any type of MPFM (127) regardless of its manufacturer or vendor.

The TASSMEEM (125) may further include a verification tool (402) configured to generate a verification assessment (404). The TASSMEEM (125) may use the verification tool (402) to obtain input diagnostic parameter data (406). The input diagnostic parameter data (406) may consist of measurements and sensory data acquired by the MPFM (127). For example, the input diagnostic parameter data (406) may include values of a temperature sensor (308), pressure sensor (306), and nuclear detector (312). Input diagnostic parameter data (406) may include gamma count data, input voltage data, and radio-active source (RAS) data. Input diagnostic parameter data (406) may include operating temperature of the flow computer (324) and voltages supplied to any of the sensors in the MPFM (127). In general, the input diagnostic parameter data (406) may include any measured quantity or available data from, and associated with, the MPFM (127). The verification tool (402) includes a first model (408). The first model (408) is a machine-learned model. A greater description of machine-learned models is provided later in the instant disclosure. For now, it is sufficient to say that the first model (408) is trained and configured to process the input diagnostic parameter data (406) and identify issues, or potential issues, in the MPFM (127). For example, in one or more embodiments, the first model (408) may be configured to generate a verification assessment (404) to output the state or condition of the MPFM (127) from a set of prespecified states, such as “normal,” “malfunction,” and “suspicious.” In other embodiments, the first model (408) may detect anomalies in the MPFM diagnostic inputs, such as abnormal temperature readings. Associated with the output of the first model (408), the verification assessment (404) further includes first recommended actions (410). The first recommended actions (410) may include an alarm and/or a maintenance recommender. The first recommended actions (410) may include a collection of rules that, based on the output of the first model (408), can trigger and transmit an alarm to a user or another system. Each alarm may have a priority level. For example, in one or more embodiments, alarms may be categorized has “high,” “medium,” and “low” priority.

In accordance with one or more embodiments, the first recommended action (410) indicates which component of the MPFM (127) is malfunctioning greatly reducing the time required for a maintainer to identify and correct the issue. In one or more embodiments, the verification tool (402) may recommend service to a MPFM (127) or component of an MPFM (127) before a malfunction occurs. For example, the verification tool (402), in coordination with the first model (408) in the verification assessment (404), may detect an increase in the frequency of anomalous sensor readings (e.g., temperature sensor (308)) and recommend servicing or replacing the associated sensor in a MPFM (127). Or, as another example, the verification tool (402) may detect non-stationary and increasing variance in the recorded values of a sensor or a divergence between two or more sensors with identified correlations.

A major advantage of the verification tool (402), which uses in part the verification assessment (404) is that it can identify potential issues or degrading equipment and provide proactive and preventative maintenance recommendations that are informed by the current condition and history of a MPFM (127) as opposed to a time-based, unfocused maintenance approach. Currently, MPFMs (127) are repaired reactively and maintained according to a predefined schedule. For example, a faulty MPFM (127) may transmit inaccurate phase flowrates that may result in temporarily taking well and/or oil and gas field analyses and optimization efforts, which rely on phase flowrates, offline. In order to restore high-priority systems that are dependent on phase flowrates, a maintainer may be immediately dispatched to repair or replace the MPFM (127). Such reactive service visits are costly in terms of personnel time and resource allocation. Further, scheduled preventative maintenance, while helpful in mitigating downtime incidents, is diluted and inefficient, as many MPFMs (127) will not require extensive, or any, servicing to remain operational and accurate. Thus, because the verification tool (402) can identify potential issues and degrading equipment, the efforts of maintenance personnel can be focused on emerging problems and dynamically scheduled according to need. This knowledge enables the optimization of maintenance visits, especially to oil and gas fields that reside offshore, which, in turn, reduces the maintainer risk associated with the visits while minimizing equipment downtime.

The TASSMEEM (125) may further includes a validity tool (412). The validity tool (412) includes a validation assessment (414). The validity tool (412) is configured to receive operating data (400) acquired by the MPFM (127) and generate a validation assessment (414). The validity tool (412) compares current flowrate measurement data measured by the MPFM (127) with historical flowrate measurement data measured by the MPFM (127) to generate a validation assessment (414) identifying whether the current flowrate measurement data satisfies a validity criterion for the MPFM (127). The validity criterion includes any threshold or predefined value needed to validate the current flowrate measurement data, such as any indication of a hardware failure of the MPFM (127).

For example, the validity criterion may include but is not limited to any one of the following series of checks based on values measured by the MPFM (127). Example checks may be applied to MPFM input voltage, MPFM venturi differential pressure calibration, MPFM gamma detector system, MPFM line pressure transmitter, and MPRM line temperature transmitter. A person of ordinary skill in the art may appreciate the following series of potential checks used for the validity criterion in one or more embodiments. For example, the validation assessment (414) checks if the MPFM input voltage is greater than 24 Volts of Direct Current (VDC) or less than 18 VDC. If the MPFM input voltage fails to be within 18 VDC and 24 VDC, this indicates a hardware failure and the MPFM input voltage needs to be checked. In one or more embodiments, the validation assessment (414) checks if the MPFM venturi differential pressure is greater than 5 millibar (mbar) when there is no fluid flow and indicates the MPFM differential pressure needs to be recalibrated. In one or more embodiments, the validation assessment (414) checks if the MPFM gamma count rate is zero during fluid flow of the MPFM and indicates hardware failure and the MPFM gamma detectors system has to be checked. In one or more embodiments, the validation assessment (414) checks the MPFM line pressure. If the MPFM line pressure is not within 5% of the upstream MPFM skid pressure sensor value, the validation assessment (414) indicates hardware failure, and the MPFM line pressure transmitter needs to be checked. In one or more embodiments, the validation assessment (414) checks the MPFM line temperature. If the MPFM line temperature is not within 5% of the upstream MPFM skid temperature sensor value, the validation assessment (414) indicates hardware failure, and the MPFM line temperature sensor needs to be checked.

In the case where the validity tool (412) identifies that the current flowrate measurement fails to satisfy the validity criterion, the TASSMEEM uses the VFM (416) included in the validity tool (412) to generate a VFM measurement using a second model (418). The second model (418) includes at least one machine-learned model. A greater description of machine-learned models is provided later in the instant disclosure. In general, a VFM (416) operates using one or more numerical models to estimate the individual phase flowrates of a multiphase fluid using readily available field device data. In accordance with one or more embodiments, the VFM (416) receives and processes VFM inputs (420) based on operating data (400) with the second model (418) to determine the individual phase flowrates. For clarity, when the phase flowrates are estimated using the VFM (416), they are referred to as VFM measurements (422). When the VFM (416) is operating on a producing well, or with an oil and gas field, outside of testing or training procedures, the VFM (416) is said to be operating "in-production." While the validity tool (412) does not detect any issues or malfunctions with the MPFM (127), the VFM measurements (422) may be compared with historical flowrate measurements in the operating data (400) acquired by the MPFM (127) using the validity tool (412). The validity tool (412) may recommend adjustments to the second model (418) such that the VFM measurements (422) more closely align with the historical flowrate measurements.

As discussed, in one or more embodiments, the first model (408) and the second model (418) are machine-learned models, or are, at least in part, composed of machine-learned models. Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Figure 5:
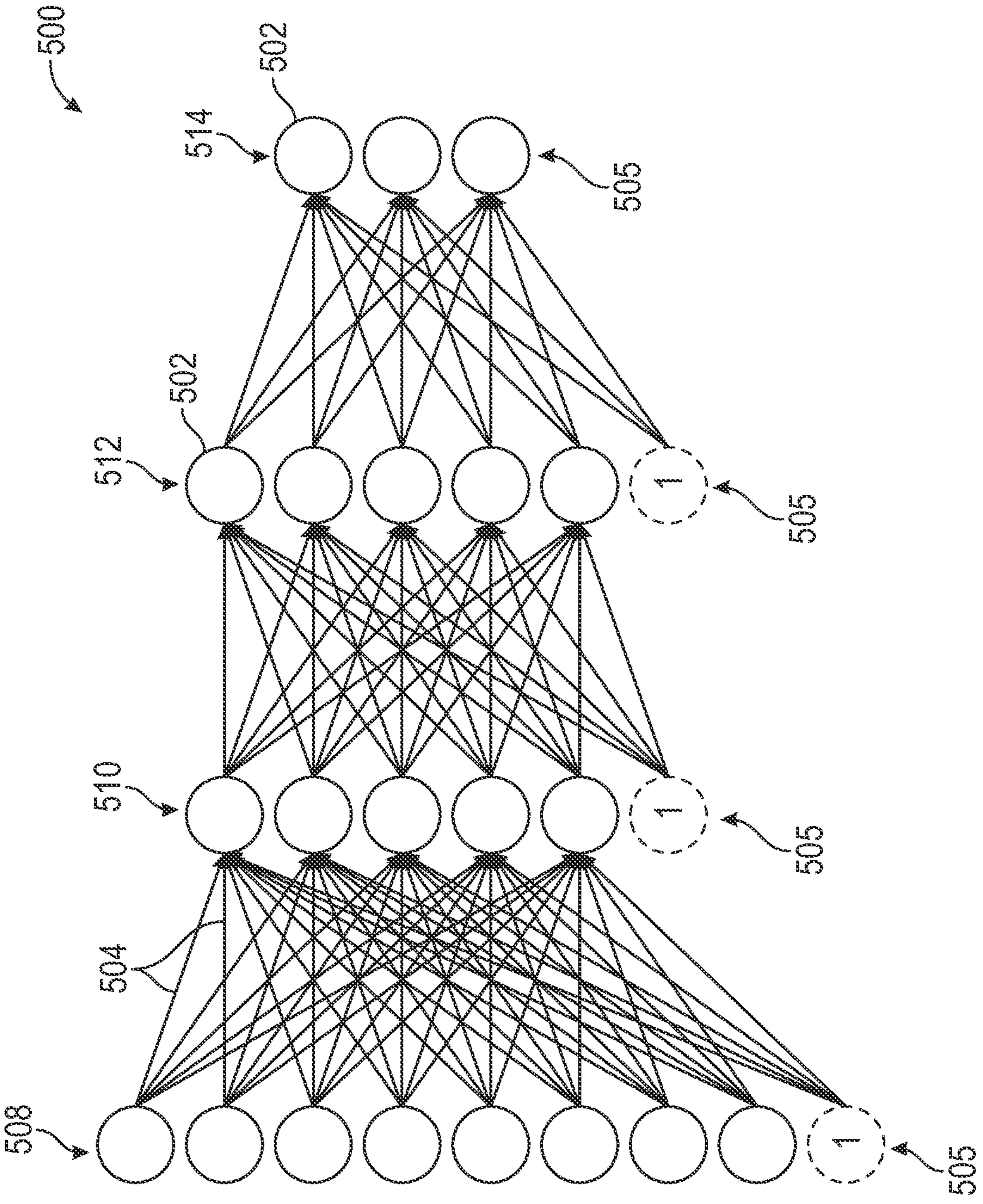
FIG. 5 depicts a neural network, in accordance with one or more embodiments.

Machine-learned model types may include, but are not limited to, neural networks, random forests, generalized linear models, and Bayesian regression. Machine-learned model types are usually associated with additional "hyper-parameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyper-parameter surrounding a model is referred to as selecting the model "architecture." Consequently, in many circumstances, a machine-learned model may be specified by indicating its type and associated hyperparameters. In one or more embodiments, the machine-learned model type of the first model (408) and/or the second model (418) is a neural network. A diagram of a neural network is shown in FIG. 5 and described later in the present disclosure.

The TASSMEEM (125) further includes a calibration tool (424) to generate a calibration assessment (426). The calibration assessment (426) includes conducting a calibration test on the MPFM at a well and validate calibration status. The calibration tool (424) is configured to obtain calibration data (428) for the MPFM (127), such as MPFM component data, manufacturer calibration procedure data, and calibration frequency data. The calibration tool (424) generates a calibration assessment (426) based on the calibration data (428). The calibration assessment (426) includes a health report (430) identifying whether the MPFM (127) requires a second recommended action (432). The second recommended action (432) may include an alarm and/or a maintenance recommender. The second recommended action (432) may include a collection of rules that, based on the output of the calibration assessment (426), can trigger and transmit an alarm to a user or another system. Each alarm may have a priority level. For example, in one or more embodiments, alarms may be categorized has "high," "medium," and "low" priority.

In one or more embodiments, each MPFM (127) requires its own type of calibration. The calibration tool (424) performs a standalone calibration method based on the calibration data (428). The standalone calibration method may include isolating the MPFM (127), depressurizing and opening an upper flange of the MPFM (127), and analyzing liquid samples to minimize unnecessary field visits and reduce human intervention. The calibration method may include categories such as no flow (e.g., empty pipe) or with flow. Calibration performed at no flow may include checking parameters such as venturi differential pressure, RAS count rate, etc. A MPFM (127) at an RAS may require frequent calibration due to rapid disintegrating over time. Generally at no flow, the upper flange of the MPFM (127) is opened at the test line after depressurizing and cleaning the venturi channel thoroughly before calibration can be performed. TASSMEEM (125) provides a calibration tool (424) without opening MPFM upper flanges to compare a total gamma ray count rate at the no flow condition to a total gamma count rate expected after decay for a specific time period. If the total gamma ray count rate is within an expected decay range margin, the total gamma count rate is deemed valid and the calibration is complete and no second recommended action (432) is identified as required in the calibration assessment (426). If the total gamma ray count rate fails to satisfy the decay range margin, then the calibration assessment (426) identifies a second recommended action (432) required, such as opening the upper flange of the MPFM (127) for cleaning and inspection.

Calibration performed on an MPFM (127) with flow requires an analysis of well fluid samples remotely to update fluid properties and mass attenuation. The calibration tool (424) may conduct the calibration method through a portable lab using one MPFM (127) skid or piping segment consisting of different lab analysis components, such as an electric centrifuge heater and MPFM (127) skid, densitometer, etc.

The TASSMEEM (125) further includes an action point (434). The TASSMEEM (125) utilizes the validation assessment (414), the VFM measurements (422), the verification assessment, and the calibration assessment (426) to transmit the action point (434). The action point (434) includes an alarm for a procedure that adjusts or replaces the MPFM (127). The action point (434) may include a short-term or long-term maintenance operation recommendation. A person of ordinary skill in the art may appreciate that short-term recommendations may include utilizing the VFM in case of MPFM hardware failure confirmation. In one or more embodiments, a person of ordinary skill in the art may appreciate that long-term recommendations may include replacing a faulty item of the MPFM in case of hardware failure confirmation.

FIG. 5 shows a diagram of a neural network in accordance with one or more embodiments. At a high level, a neural network (500) may be graphically depicted as being composed of nodes (502), where here any circle represents a node, and edges (504), shown here as directed lines. The nodes (502) may be grouped to form layers (505). FIG. 5 displays four layers (508, 510, 512, 514) of nodes (502) where the nodes (502) are grouped into columns, however, the grouping need not be as shown in FIG. 5. The edges (504) connect the nodes (502). Edges (504) may connect, or not connect, to any node(s) (502) regardless of which layer (505) the node(s) (502) is in. That is, the nodes (502) may be sparsely and residually connected. A neural network (500) will have at least two layers (505), where the first layer (508) is considered the "input layer" and the last layer (514) is the "output layer". Any intermediate layer (510, 512) is usually described as a "hidden layer". A neural network (500) may have zero or more hidden layers (510, 512) and a neural network (500) with at least one hidden layer (510, 512) may be described as a "deep" neural network or as a "deep learning method." In general, a neural network (500) may have more than one node (502) in the output layer (514). In this case the neural network (500) may be referred to as a "multi-target" or "multi-output" network.

Nodes (502) and edges (504) carry additional associations. Namely, every edge is associated with a numerical value. The edge numerical values, or even the edges (504) themselves, are often referred to as "weights" or "parameters". While training a neural network (500), numerical values are assigned to each edge (504). Additionally, every node (502) is associated with a numerical variable and an activation function. Activation functions are not limited to any functional class, but traditionally follow the form $$A = f\left(\sum_{i\in(incoming)} [(\text{node value})_i(\text{edge value})_i]\right),$$

where i is an index that spans the set of "incoming" nodes (502) and edges (504) and f is a user-defined function. Incoming nodes (502) are those that, when viewed as a graph (as in FIG. 5), have directed arrows that point to the node (502) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (502) in a neural network (500) may have a different associated activation function. Often, as a shorthand, activation functions are described by the function $f$ by which it is composed. That is, an activation function composed of a linear function $f$ may simply be referred to as a linear activation function without undue ambiguity.

When the neural network (500) receives an input, the input is propagated through the network according to the activation functions and incoming node (502) values and edge (504) values to compute a value for each node (502). That is, the numerical value for each node (502) may change for each received input. Occasionally, nodes (502) are assigned fixed numerical values, such as the value of 1, that are not affected by the input or altered according to edge (504) values and activation functions. Fixed nodes (502) are often referred to as "biases" or "bias nodes" (505), displayed in FIG. 5 with a dashed circle.

In some implementations, the neural network (500) may contain specialized layers (505), such as a normalization layer, or additional connection procedures, like concatenation. One skilled in the art will appreciate that these alterations do not exceed the scope of this disclosure.

As noted, the training procedure for the neural network (500) comprises assigning values to the edges (504). To begin training the edges (504) are assigned initial values. These values may be assigned randomly, assigned according to a prescribed distribution, assigned manually, or by some other assignment mechanism. Once edge (504) values have been initialized, the neural network (500) may act as a function, such that it may receive inputs and produce an output. As such, at least one input is propagated through the neural network (500) to produce an output. Generally, a training dataset is provided the neural network for training. The training dataset is composed of inputs and associated target(s), where the target(s) represent the "ground truth", or the otherwise desired output. The neural network (500) output is compared to the associated input data target(s). The comparison of the neural network (500) output to the target(s) is typically performed by a so-called "loss function"; although other names for this comparison function such as "error function" and "cost function" are commonly employed. Many types of loss functions are available, such as the mean-squared-error function, however, the general characteristic of a loss function is that the loss function provides a numerical evaluation of the similarity between the neural network (500) output and the associated target(s). The loss function may also be constructed to impose additional constraints on the values assumed by the edges (504), for example, by adding a penalty term, which may be physics-based, or a regularization term. Generally, the goal of a training procedure is to alter the edge (504) values to promote similarity between the neural network (500) output and associated target(s) over the data set. Thus, the loss function is used to guide changes made to the edge (504) values, typically through a process called "backpropagation."

While a full review of the backpropagation process exceeds the scope of this disclosure, a brief summary is provided. Backpropagation consists of computing the gradient of the loss function over the edge (504) values. The gradient indicates the direction of change in the edge (504) values that results in the greatest change to the loss function. Because the gradient is local to the current edge (504) values, the edge (504) values are typically updated by a "step" in the direction indicated by the gradient. The step size is often referred to as the "learning rate" and need not remain fixed during the training process. Additionally, the step size and direction may be informed by previously seen edge (504) values or previously computed gradients. Such methods for determining the step direction are usually referred to as "momentum" based methods.

Once the edge (504) values have been updated, or altered from their initial values, through a backpropagation step, the neural network (500) will likely produce different outputs. Thus, the procedure of propagating at least one input through the neural network (500), comparing the neural network (500) output with the associated target(s) with a loss function, computing the gradient of the loss function with respect to the edge (504) values, and updating the edge (504) values with a step guided by the gradient, is repeated until a termination criterion is reached. Common termination criteria include: reaching a fixed number of edge (504) updates, otherwise known as an iteration counter; a diminishing learning rate; noting no appreciable change in the loss function between iterations; reaching a specified performance metric as evaluated on the data or a separate hold-out dataset. Once the termination criterion is satisfied, and the edge (504) values are no longer intended to be altered, the neural network (500) is said to be "trained."

Figure 6:
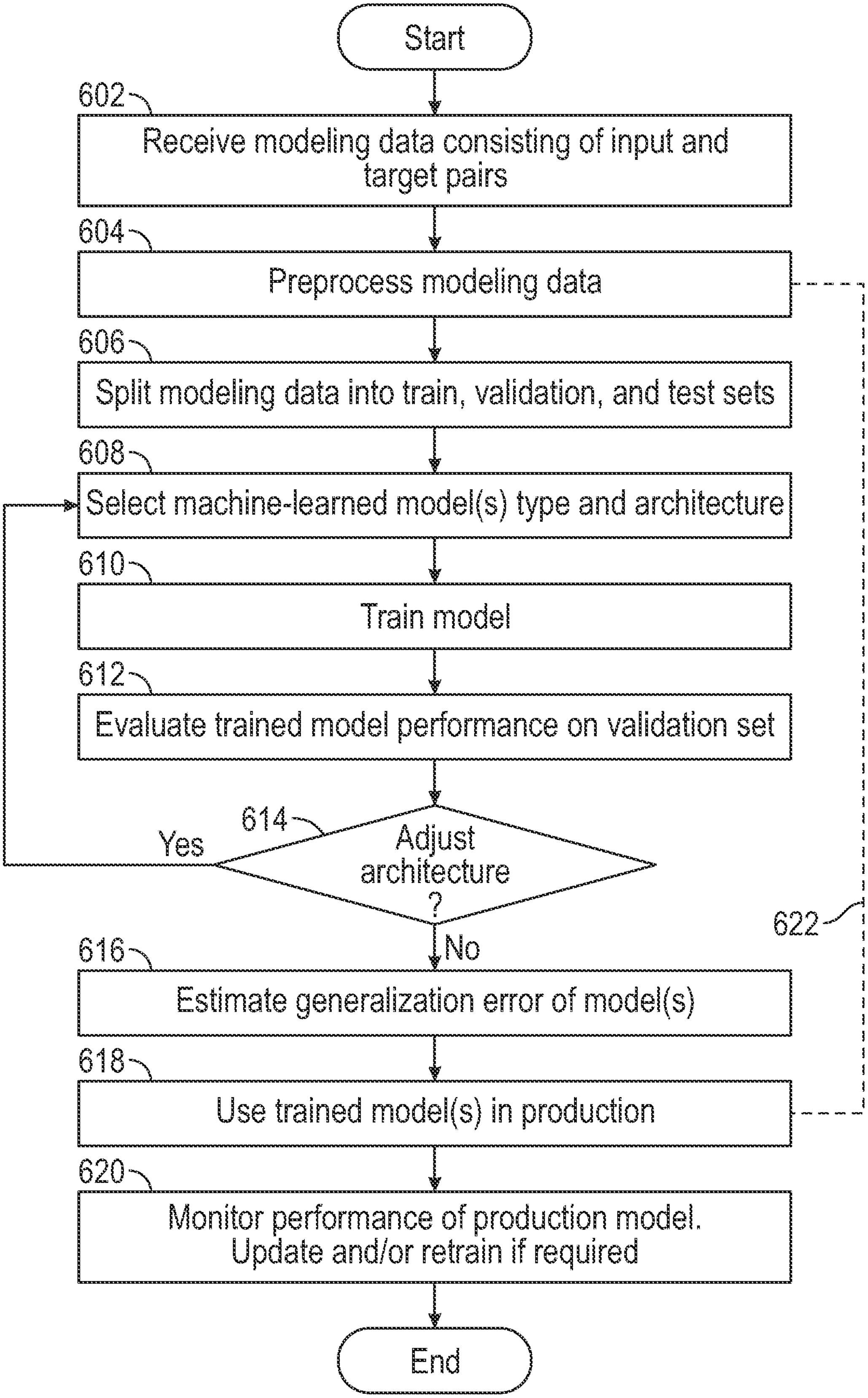
FIG. 6 depicts a flowchart, in accordance with one or more embodiments.

FIG. 6 depicts the general process of selecting and training a machine-learned model, in accordance with one or more embodiments. The process shown in FIG. 6 may be applied to train the first model (408) and/or the second model (418).

To start, as shown in Block 602, modelling data is received. The modelling data consists of input and target pairs. For example, to train the first model (408), an input and target pair may consist of the input diagnostic parameter data (406) and the associated state or condition of the MPFM (127) at the time when the input diagnostic parameter data (406) were collected. In accordance with one or more embodiments, the input diagnostic parameter data (406) include gamma counts, supplied voltage, Venturi differential pressure, and the flow computer (324) temperature of the MPFM (127). In one or more embodiments, the state or condition of the MPFM (127) is determined manually by an operator.

Likewise, to train the second model (418), the modelling data consists of pairs of VFM inputs (420) and the associated phase flowrates. In accordance with one or more embodiments, the VFM inputs include, but are not limited to: wellhead pressure, upstream wellhead temperature, downstream wellhead pressure, Venturi differential pressure, choke valve position, ESP frequency, and ESP motor current. The VFM inputs are collected using field devices appropriately disposed on the pipeline (100).

In other words, in general, the modelling data consists of the expected input and desired output for the machine-learned model. In accordance with one or more embodiments, the modelling data is acquired from one or more existing wells or from previously collected historical well data. Returning to FIG. 6, in one or more embodiments, the modelling data is preprocessed as depicted by Block 604. Preprocessing, at a minimum, comprises altering the modelling data so that it is suitable for use with machine-learned models. For example, numericalizing categorical data or removing data entries with missing values. Other typical preprocessing methods are normalization and imputation. Information surrounding the preprocessing steps is saved for potential later use. For example, if normalization is performed then a computed mean vector and variance vector are retained. This allows future modelling data to be preprocessed identically. Values computed and retained during preprocessing are referred to herein as preprocessing parameters. One with ordinary skill in the art will recognize that a myriad of preprocessing methods beyond numericalization, removal of modelling data entries with missing values, normalization, and imputation exist. Descriptions of a select few preprocessing methods herein do not impose a limitation on the preprocessing steps encompassed by this disclosure.

As shown in Block 606, the modelling data is split into training, validation, and test sets. In some embodiments, the validation and test set may be the same such that the data is effectively only split into two distinct sets. In some instances, Block 606 may be performed before Block 604. In this case, it is common to determine the preprocessing parameters, if any, using the training set and then to apply these parameters to the validation and test sets.

In Block 608, one or more machine-learned model types and associated architectures are selected. For example, in one or more embodiments, the first model and/or the second model are composed of more than one machine-learned models. In this case, each of the one or more machine-learned models are selected. For each machine-learned model, once the machine-learned model type and hyperparameters have been selected, the machine-learned model is trained using the training set of the modelling data according to Block 610. Common training techniques, such as early stopping, adaptive or scheduled learning rates, and cross-validation may be used during training without departing from the scope of this disclosure.

During training, or once trained, the performance of the trained machine-learned model is evaluated using the validation set as depicted in Block 612. Recall, that in some instances, the validation set and test set are the same. Generally, performance is measured using a function which compares the predictions of the trained machine-learned model to the given targets. A commonly used comparison function is the mean-squared-error function, which quantifies the difference between the predicted value and the actual value when the predicted value is continuous, however, one with ordinary skill in the art will appreciate that many more comparison functions exist and may be used without limiting the scope of the present disclosure.

Block 614 represents a decision: if the trained machine-learned model performance, as measured by a comparison function on the validation set (Block 612), is not suitable, the machine-learned model architecture may be altered (i.e., return to Block 608) and the training process is repeated. There are many ways to alter the machine-learned model architecture in search of suitable trained machine-learned model performance. These include, but are not limited to: selecting a new architecture from a previously defined set; randomly perturbing or randomly selecting new hyperparameters; using a grid search over the available hyperparameters; and intelligently altering hyperparameters based on the observed performance of previous models (e.g., a Bayesian hyperparameter search). Once suitable performance is achieved, the training procedure is complete and the generalization error of the trained machine-learned model(s) is estimated according to Block 616.

Generalization error is an indication of the trained machine-learned model's performance on new, or un-seen data. Typically, the generalization error is estimated using the comparison function, as previously described, using the modelling data that was partitioned into the test set.

As depicted in Block 618, the trained machine-learned model(s) is used "in production"—which means the trained machine-learned model(s) is used to process a received input without having a paired target for comparison. It is emphasized that the inputs received in the production setting, as well as for the validation and test sets, are preprocessed identically to the manner defined in Block 604 as denoted by the connection (622), represented as a dashed line in FIG. 6, between Blocks 618 and 604.

In accordance with one or more embodiments, the performance of the trained machine-learned model(s) is continuously monitored in the production setting in Block 620. As an example, when the MPFM is determined to be healthy by the first model, the VFM measurement, which are the output of the second model can be compared to the current flowrate measurement data using the validity tool. That is, the current flowrate measurement data can be compared to the VFM measurement from the second model using a comparison function to monitor performance. If model performance is suspected to be degrading, as observed through in-production performance metrics, the model may be updated. An update may include retraining the model, by reverting to Block 608, with the newly acquired modelling data from the in-production recorded values appended to the training data. An update may also include returning to Block 604 to recalculate any preprocessing parameters, again, after appending the newly acquired modelling data to the existing modelling data.

While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 7:
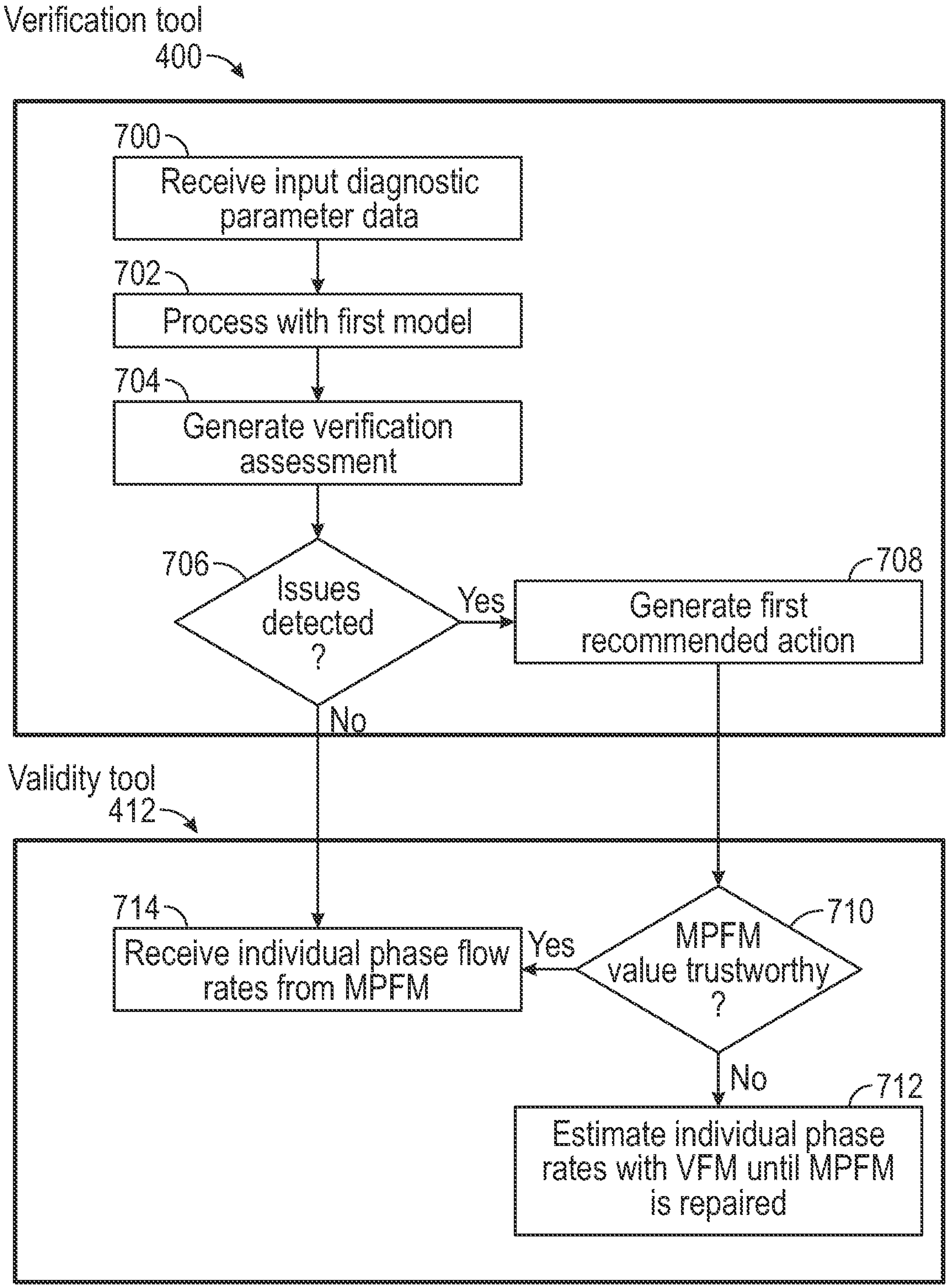
FIG. 7 depicts a flowchart, in accordance with one or more embodiments.

Given that the TASSMEEM (125) can, at any given time, output Current or historical flowrate data and VFM measurements (422) to a user and/or an external system, FIG. 7 depicts a flowchart demonstrating which flowrate should be used using the verification tool (402) and the validity tool (412). As shown in Block 700, the TASSMEEM (125) receives MPFM diagnostic inputs from the MPFM (127). The input diagnostic parameter data (406) are processed with the first model (408) as shown in Block 702. In Block 704, the verification tool (402) generates a verification assessment (404) using the first model (408) to determine and identify issues (e.g., malfunctions) and potential issues (e.g., infrequent anomalous behavior) with the MPFM (127) associated with the input diagnostic parameter data (406). In Block 706, if no issues (or potential issues) are detected in the verification assessment (404), then the TASSMEEM (125) uses the received the individual flowrates directly from the MPFM (127). If, however, in Block 706, any issues or potential issues are detected, a first recommended action is generated by the verification tool (402) in Block 708. Further, in Block 710, the validity tool (412) determines the trustworthiness of the MPFM (127) based on the detected issue or potential issue. For example, if the detected issue indicates that the MPFM (127) is malfunctioning (i.e., the MPFM is in a state of fault) then the Current or historical flowrate data are not considered trustworthy. In this case, the individual flowrates are estimated using the VFM (416) (i.e., the second model (418)) until the MPFM (127) is repaired, replaced, or otherwise made functional and accurate as depicted in Block 712. If, however, in Block 714, the MPFM (127), despite the detected issue, is thought to be trustworthy, then the TASSMEEM (125) continues to use the Current or historical flowrate data. For example, the validity tool (412) may indicate that the MPFM (127) is degrading and should undergo preventative maintenance in the near future but is currently not in error.

Figure 8:
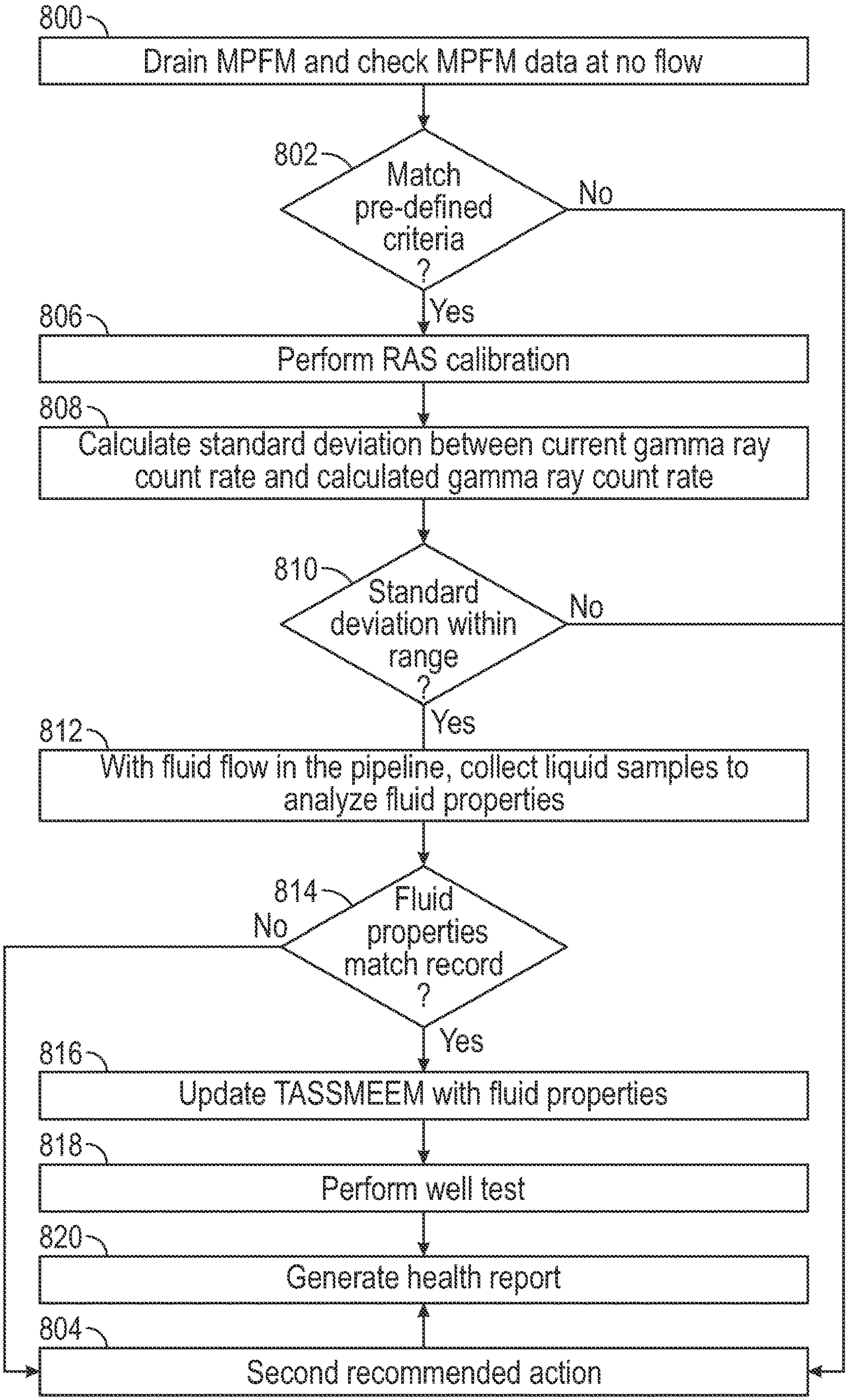
FIG. 8 depicts a flowchart, in accordance with one or more embodiments.

FIG. 8 shows a flowchart outlining usage of the calibration tool (424) in the TASSMEEM (125) in accordance with one or more embodiments. The calibration tool (424) performs a standalone calibration method based on calibration data (428) including MPFM component data, manufacturer calibration procedure data, and calibration frequency data. In Block 800, the MPFM (127) is drained and MPFM raw data is checked at no fluid flow. The calibration data (428) may include predefined main parameters obtained by the TASSMEEM (125) including but not limited to venturi differential pressure, pressure data, temperature data, mixture density, MPFM size, RAS installation date, RAS gamma ray count rate, last RAS calibration date, estimated RAS gamma ray count rate based on manufacturer decay record, permittivity, etc. In Block 802, the calibration tool (424) checks if the MPRM raw data matches pre-defined main parameter criteria as previously described as the series of checks in FIG. 4. If the MPFM raw data does not match the pre-defined criteria, a second recommended action (432) is generated in Block 804. If the MPFM raw data matches the pre-defined criteria, an RAS calibration is performed in Block 806.

In Block 808, the calibration tool (424) uses the RAS calibration to calculate a standard deviation by comparing a current gamma ray count rate to a calculated gamma ray count rate. In Block 810, the calibration tool (424) checks if the standard deviation is within an acceptable range. For example, a person of ordinary skill in the art would appreciate that the acceptable standard deviation range is dependent on RAS type. In one or more embodiments, for a Ba 133 RAS, the low range of standard deviation is between −1.5% and 0.3% and the high range of standard deviation is between −1% and 0.1%. If the standard deviation is not within the acceptable range, the calibration tool (424) generates a second recommended action in Block 804. If the standard deviation is within the acceptable range, the calibration tool moves forward with collecting liquid samples in a fluid flowing pipeline to analyze fluid properties in Block 812. In Block 814, the calibration tool (424) checks if the fluid properties match the MPFM (127) fluid properties record included in the calibration data (428). If the fluid properties do not match the MPFM (127) fluid properties record, the calibration tool (424) generates a second recommended action (432) in Block 804. If the fluid properties match the MPFM (127) fluid properties record, the TASSMEEM (125) is updated with the current fluid properties analysis in Block 816. In Block 818, a well test may be performed by the MPFM (127). In Block 820, the calibration tool (424) generates a health report (430) identifying whether the MPFM (127) requires the second recommended action based on if any or all steps generated the second recommended action.

Figure 9:
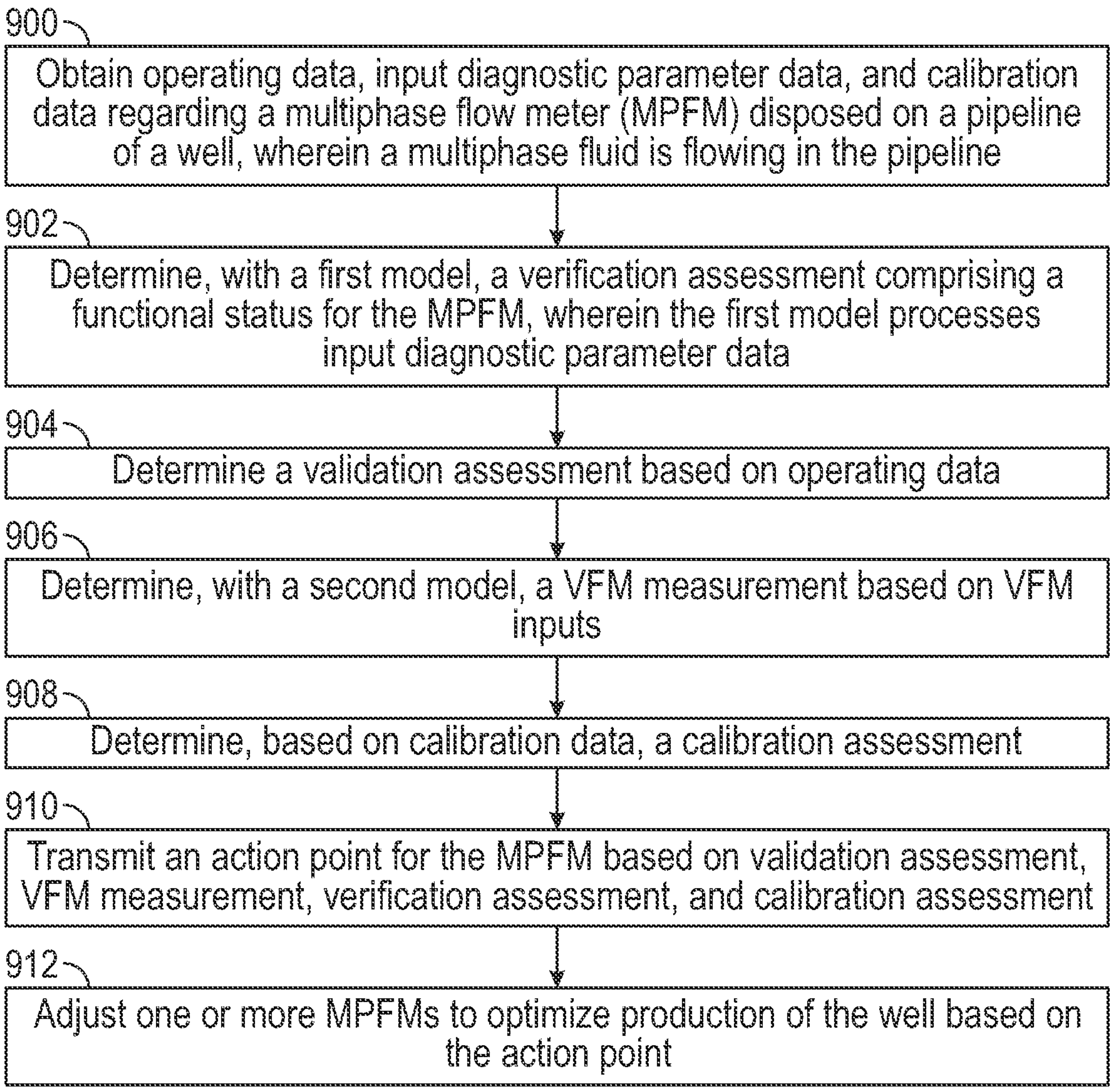
FIG. 9 depicts a flowchart, in accordance with one or more embodiments.

FIG. 9 depicts a flowchart outlining usage of the TASSMEEM in accordance with one or more embodiments. In Block 900, the TASSMEEM obtains operating data, input diagnostic parameter data, and calibration data regarding an MPFM disposed on a pipeline of a well. A multiphase fluid is flowing in the pipeline of the well. The multiphase fluid may be composed of oil, water, and gas flowing through the pipeline of a production system. The input diagnostic parameter data may include measurements from the internal components of the MPFM including gamma count data, input voltage data, pressure data, temperature data, and RAS data.

In Block 902, a verification assessment is determined using a first model. The first model is composed of one or more machine-learned models and is configured to process the input diagnostic parameter data and output the verification assessment. The verification assessment includes status report identifying a functional status or condition for the MPFM. In one or more embodiments, the first model identifies issues or potential issues surrounding the MPFM. Further, the functional status of the MPFM indicates, at a minimum, if the MPFM is in a state of fault (i.e., malfunctioning, flowrates determined by MPFM are not trustworthy). The status report identifies whether the MPFM requires a first recommended action.

In Block 904, a validation assessment is generated based on operating data by comparing current flowrate measurement data and historical measurement data. The validation assessment identifies whether current flowrate measurement data satisfy a validity criterion for the MPFM, such as indication of hardware failure regarding the MPFM. If the validation assessment indicates that the current flowrate measurement data fails to satisfy the validity criterion, the validity tool generates a VFM measurement. In Block 906, a second model is used to process VFM inputs to output a VFM measurement. The second model is composed of at least one machine-learned model. In one or more embodiments, the second model is composed of multiple, independent, machine-learned models. In this case, the VFM measurement of the multiple machine-learned models of the second model are each compared to the current flowrate measurement data from the MPFM and historical flowrate measurement data to determine if the current flowrate measurement data are considered trustworthy. Based on the state of the MPFM as determined by the first model and the second model, the TASSMEEM may determine which of the flowrate measurement data should be used, the MPFM measured current flowrate measurement data if the MPFM is determined to not be in a state of fault or the VFM measurement if the MPFM is determined to be in a state of fault. In one or more embodiments, when the second model is composed of more than one machine-learned models and the MPFM is determined to be in a state of fault, the machine-learned model that had the closest approximation to historical flowrate measurement data before the MPFM was determined to be in a state of fault is used as the VFM measurement.

In Block 908, a calibration assessment is generated based on calibration data such as MPFM component data, manufacturer calibration procedure data, and calibration frequency data. The calibration assessment includes a health report identifying whether the MPFM requires a second recommended action. The calibration assessment includes conducting calibration tests at the well in the production system. The calibration tests may be conducted at no fluid flow in the pipeline and/or with fluid flow in the pipeline. No fluid flow may indicate opening an upper flange of the MPFM and draining the MPFM.

In Block 910, an action point is transmitted by the TASSMEEM based on the validation assessment, VFM measurement, verification assessment, and calibration assessment. The action point includes an alarm for a procedure to adjust or replace the MPFM. In Block 912, based on the action point, the TASSMEEM may adjust the settings of one or more field devices to optimize production of the well. While the flowchart of FIG. 9 references a swingle MPFM disposed on a pipeline in a production system, the TASSMEEM is not limited to a single MPFM. In general, the TASSMEEM can encompass many pipelines each with one or more MPFMs. Further, the TASSMEEM can work with any MPFM regardless of the vendor of the MPFM. Thus, when a MPFM malfunctions, and the flowrate measurement data at the location of the MPFM is either inaccurate or non-existent, the TASSMEEM can detect the MPFM malfunction, identify the issue with the affected MPFM, provide short term and long term recommended actions for the MPFM, proactively prescribe MPFM preventative maintenance actions, and provide estimated flowrates using VFM. The flowrate data determined and output by the TASSMEEM may be used by a reservoir simulator or subsurface model to optimize production of hydrocarbons from a well and/or oil and gas field. As such, the TASSMEEM provides accurate multiphase flowrate measurements from a well, or oil and gas field, without interruption, even when one or more MPFMs are malfunctioning. Further, the TASSMEEM allows for proactive and intelligent scheduling of MPFM maintenance activities.

Embodiments may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002)) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or other suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 5, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 5, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 5, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), each computer (1002) communicating over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

In some embodiments, the computer (1002) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for a testing augmentation and engineering enhancement manager, comprising:

obtaining, by a computer processor, operating data, input diagnostic parameter data, and calibration data regarding a multi-phase flow meter (MPFM) in a production system, wherein operating data comprises current flowrate measurement data and historical flowrate measurement data of a multiphase fluid flowing in a pipeline in the production system, wherein the input diagnostic parameter data comprises gamma ray count data, input voltage data, and radioactive source (RAS) data from the MPFM;

determining, by the computer processor and based on the input diagnostic parameter data, a verification assessment using a first machine-learning model trained to output a functional status for the MPFM, wherein the verification assessment comprises a status report identifying whether the MPFM requires a first recommended action;

determining, by the computer processor and based on the operating data, a validation assessment by comparing the current flowrate measurement data and the historical flowrate measurement data, wherein the validation assessment identifies whether the current flowrate measurement data satisfies a validity criterion for the MPFM;

in response to the current flowrate measurement data failing to satisfy the validity criterion;

determining a virtual flow meter (VFM) measurement using a second machine-learning model based on a plurality of VFM inputs in the operating data, wherein the second-machine learning model is trained on field device measurements from the production system; and substituting the VFM measurement for the current flowrate measurement data as an output of the production system;

determining, by the computer processor and based on the calibration data, a calibration assessment comprising a health report identifying whether the MPFM requires a second recommended action, wherein determining the calibration assessment comprises performing a calibration test by comparing a current gamma ray count rate of the MPFM to an expected gamma ray count rate based on a radioactive source decay record; and transmitting, by the computer processor, an action point for the MPFM based on the validation assessment, the VFM measurement, the verification assessment, and the calibration assessment, wherein the action point comprises an alarm for a procedure that adjusts or replaces the MPFM.

2. The method of claim 1, wherein input diagnostic parameter data comprises pressure data and temperature data.

3. The method of claim 1, wherein the first machine-learning model is a neural network.

4. The method of claim 1, wherein the second machine-learning model is a neural network.

5. The method of claim 1, wherein the calibration data comprises MPFM component data, manufacturer calibration procedure data, and calibration frequency data.

6. The method of claim 1, wherein the operating data comprises phase fraction data and gas to oil ratio data over the production system.

7. The method of claim 1, wherein the action point comprises a short-term maintenance operation recommendation, wherein the action point comprises a long-term maintenance operation recommendation.

8. The method of claim 1, wherein the testing augmentation and engineering enhancement manager comprises the computer processor, wherein the testing augmentation and engineering enhancement manager is coupled to the MPFM and a well in the production system.

9. The method of claim 1, further comprising:

wherein the calibration test is conducted at no fluid flow in the pipeline of the well or with fluid flow of the well, wherein the well at no fluid flow comprises opening an upper flange of the MPFM.

10. The method of claim 1, wherein failing to satisfy the validity criterion comprises a hardware failure regarding the MPFM.

11. A system comprising:

a well in a production system comprising a multi-phase flow meter (MPFM) configured to measure operating data of the well;

a testing augmentation and engineering enhancement manager comprising a computer processor and coupled to the well, wherein the testing augmentation and engineering enhancement manager is configured to:

obtain, by a computer processor, the operating data, input diagnostic parameter data, and calibration data regarding the production system, wherein operating data comprises current flowrate measurement data and historical flowrate measurement data of a multiphase fluid in a pipeline in the production system, wherein the input diagnostic parameter data comprises gamma ray count data, input voltage data, and radio-active source (RAS) data from the MPFM;

determine, by the computer processor and based on the input diagnostic parameter data, a verification assessment using a first machine-learning model trained to output a functional status for the MPFM, wherein the verification assessment comprises a status report identifying whether the MPFM requires a first recommended action;

determine, by the computer processor and based on the operating data, a validation assessment by comparing the current flowrate measurement data and the historical flowrate measurement data, wherein the validation assessment identifies whether the current flowrate measurement data satisfies a validity criterion for the MPFM;

in response to the current flowrate measurement data failing to satisfy the validity criterion;

determine a virtual flow meter (VFM) measurement using a second machine-learning model based on the operating data, wherein the second-machine learning model is trained on field device measurements from the production system; and substitute the VFM measurement for the current flowrate measurement data as an output of the production system;

determine, by the computer processor and based on the calibration data, a calibration assessment comprising a health report identifying whether the MPFM requires a second recommended action, wherein determining the calibration assessment comprises performing a calibration test by comparing a current gamma ray count rate of the MPFM to an expected gamma ray count rate based on a radioactive source decay record;

transmit, by the computer processor in response to the validation assessment, the VFM measurement, the verification assessment, and the calibration assessment, an alarm that displays an action point for the MPFM, wherein the action point comprises a procedure that adjusts or replaces the MPFM.

12. The system of claim 11, wherein input diagnostic parameter data comprises pressure data and temperature data.

13. The system of claim 11, wherein the first machine-learning model is a neural network.

14. The system of claim 11, wherein the second machine-learning model is a neural network.

15. The system of claim 11, wherein the calibration data comprises MPFM component data, manufacturer calibration procedure data, and calibration frequency data.

16. The system of claim 11, wherein the operating data comprises phase fraction data and gas to oil ratio data over the production system.

17. The system of claim 11, wherein the action point comprises a short-term maintenance operation recommendation, wherein the action point comprises a long-term maintenance operation recommendation.

18. The system of claim 11, wherein the testing augmentation and engineering enhancement manager comprises the computer processor, wherein the testing augmentation and engineering enhancement manager is coupled to the MPFM and a well in the production system.

19. The system of claim 11, further comprising:

wherein the calibration test is conducted at no fluid flow in the pipeline of a well or with fluid flow in the pipeline of the well, wherein the well at no fluid flow comprises opening an upper flange of the MPFM.

20. The system of claim 11, wherein failing to satisfy the validity criterion comprises a hardware failure regarding the MPFM.

* * * * *